United States Patent
Bauer et al.

(10) Patent No.: US 10,647,416 B2
(45) Date of Patent: May 12, 2020

(54) AIRCRAFT OR SPACECRAFT FLUIDIC OSCILLATOR DEVICE

(71) Applicant: Airbus Defence and Space GmbH, Taufkirchen (DE)

(72) Inventors: Karin Bauer, Oberhaching (DE); Markus Blechschmidt, Munich (DE); Sebastian Schwarz, Munich (DE); Peter Langenbacher, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 621 days.

(21) Appl. No.: 15/386,866

(22) Filed: Dec. 21, 2016

(65) Prior Publication Data

US 2017/0174325 A1 Jun. 22, 2017

(30) Foreign Application Priority Data

Dec. 22, 2015 (DE) ........................ 10 2015 226 471

(51) Int. Cl.
*B64C 21/04* (2006.01)
*B64C 21/02* (2006.01)
*B64C 21/06* (2006.01)
*B64C 21/08* (2006.01)

(52) U.S. Cl.
CPC .............. *B64C 21/04* (2013.01); *B64C 21/02* (2013.01); *B64C 21/06* (2013.01); *B64C 21/08* (2013.01); *F05B 2210/30* (2013.01); *Y02T 50/166* (2013.01)

(58) Field of Classification Search
CPC ......... B64C 21/04; B64C 21/02; B64C 21/06; B64C 21/08; Y02T 50/166; F05B 2210/30
See application file for complete search history.

(56) References Cited

U.S. PATENT DOCUMENTS

| 7,128,082 | B1 | 10/2006 | Cerretelli et al. |
| 8,500,404 | B2* | 8/2013 | Montgomery .......... F01D 5/186 |
| | | | 415/115 |
| 8,820,658 | B2* | 9/2014 | Saddoughi .......... H01L 41/0973 |
| | | | 239/102.2 |
| 8,844,571 | B2* | 9/2014 | Golling ................. B64C 21/025 |
| | | | 137/487.5 |

(Continued)

FOREIGN PATENT DOCUMENTS

| EP | 2650213 A1 * | 10/2013 | ............. B64C 21/08 |
| EP | 2650213 A1 | 10/2013 | |
| WO | WO 2013/061276 A1 | 5/2013 | |

OTHER PUBLICATIONS

German Office Action for Application No. 102015226471 dated Aug. 4, 2016.

*Primary Examiner* — Assres H Woldemaryam
(74) *Attorney, Agent, or Firm* — Jenkins, Wilson, Taylor & Hunt, P.A.

(57) ABSTRACT

A fluidic oscillator device, in particular for a or in a flow control system for an aircraft or spacecraft, has a first and a second fluidic actuator, wherein each of the actuators has an inlet for supplying pressure and a first and a second outlet, from which an actuator flow can be discharged. The device further has a fluidic control for controlling an oscillating discharge of the actuator flow from the first and second outlet of the actuators, wherein the control has a connection portion which is arranged between the first actuator and the second actuator.

23 Claims, 11 Drawing Sheets

(56) References Cited

U.S. PATENT DOCUMENTS

| | | | | |
|---|---|---|---|---|
| 8,967,964 B2* | 3/2015 | Sheaf | ................... | B64C 11/48 |
| | | | | 415/914 |
| 2008/0149205 A1* | 6/2008 | Gupta | ................... | B64C 21/04 |
| | | | | 137/829 |
| 2013/0277502 A1* | 10/2013 | Bauer | ................... | B64C 21/08 |
| | | | | 244/208 |
| 2014/0007959 A1* | 1/2014 | Bauer | ................... | F16L 41/00 |
| | | | | 137/561 A |
| 2014/0102542 A1* | 4/2014 | Raghu | ................... | B64C 13/40 |
| | | | | 137/2 |
| 2014/0103134 A1* | 4/2014 | Raghu | ................... | B64C 21/04 |
| | | | | 239/11 |
| 2014/0284430 A1* | 9/2014 | Seifert | ................... | F15B 21/12 |
| | | | | 244/204.1 |
| 2016/0280358 A1* | 9/2016 | Lin | ................... | B64C 23/06 |
| 2016/0318602 A1* | 11/2016 | Whalen | ................... | B64C 3/14 |

* cited by examiner

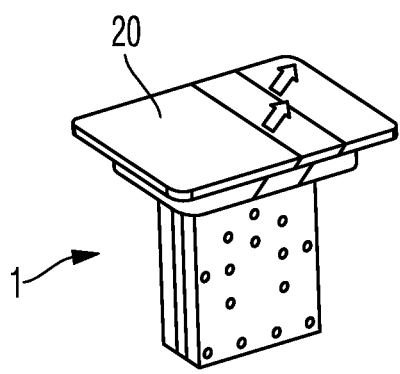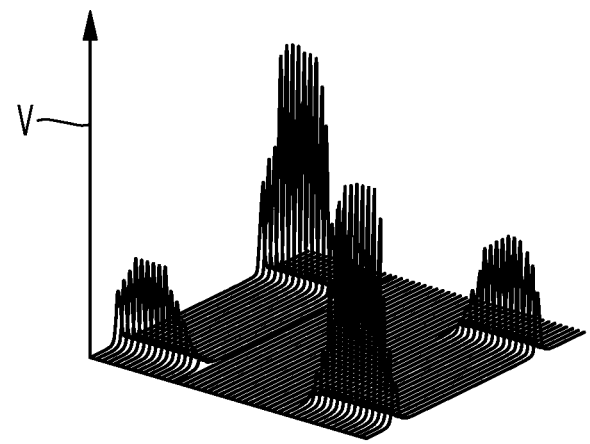
Fig. 7A  Fig. 7B
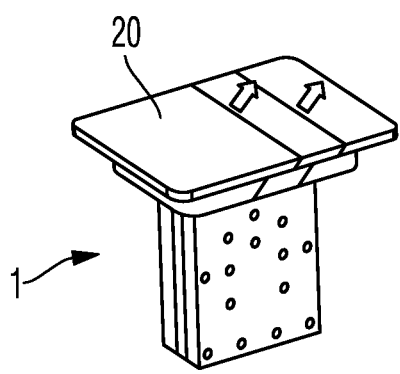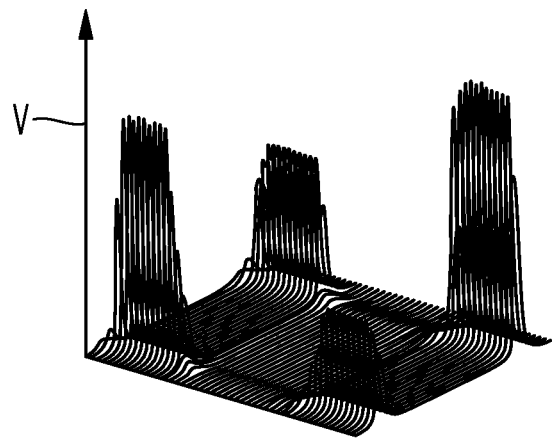
Fig. 7C  Fig. 7D

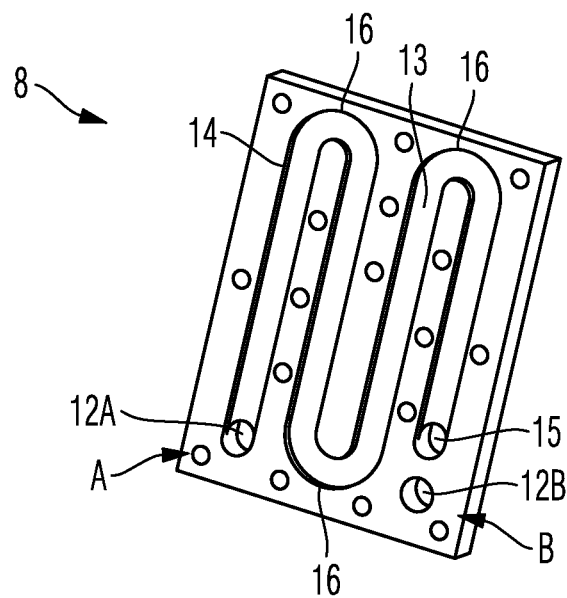
Fig. 8A
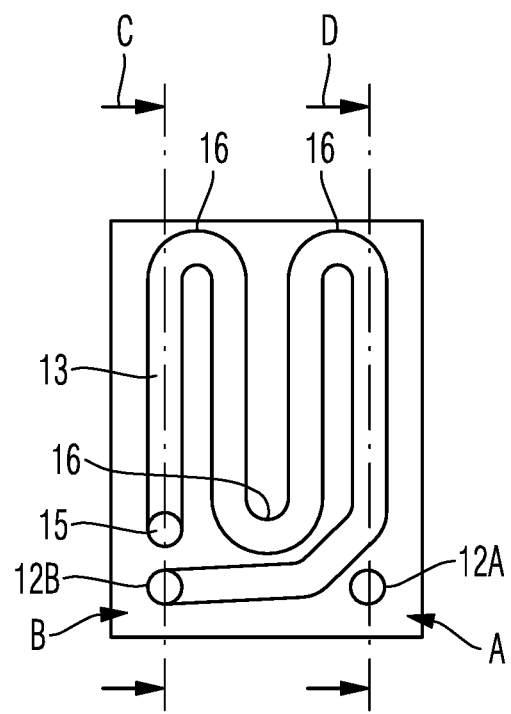 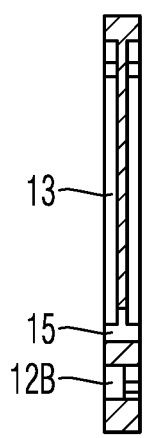 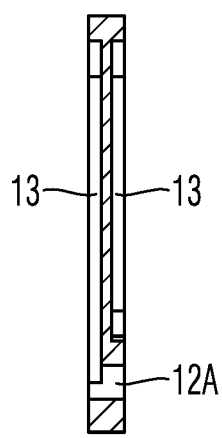
Fig. 8B  Fig. 8C  Fig. 8D

AIRCRAFT OR SPACECRAFT FLUIDIC OSCILLATOR DEVICE

CROSS-REFERENCE TO RELATED APPLICATION

This application claims priority to German Patent Application DE 10 2015 226 471.8 filed Dec. 22, 2015, the entire disclosure of which is incorporated by reference herein.

TECHNICAL FIELD

The work leading to the present subject matter has received funding from the European Union Seventh Framework Program FP7-AAT-2013-RTD-1 under grant agreement No. 604013.

The subject matter herein relates to a fluidic oscillator device, in particular for a or in a flow control system for an aircraft or spacecraft.

BACKGROUND

Although the present disclosure and the problem it addresses can be applied to any fluidic oscillator devices, they will be described in detail with reference to a flow control system for an aircraft or spacecraft.

Flow bodies, particularly for aircraft or spacecraft, must frequently have aerodynamic characteristics for different flow conditions.

Therefore, to broaden the flight range limits of an aircraft or spacecraft, mechanical solutions exist for lift systems, such as slats and/or flaps. Furthermore, there are also fluidic solutions, known as flow control systems, which manage without mechanical components.

A flow control system of this type is described, for example, in EP 2 650 213 A1. There, a multiplicity of openings is provided in a wing surface, the openings being arranged next to one another along or parallel to the leading edge of the wing. Discharged through the openings is a pulsating air flow which is provided by a fluidic oscillator device. The pulsating discharge of the air flow is provided to prevent separations of the flow at relatively great angles of incidence, without mechanical wing components being required for this purpose. For example, flow control systems of this type are used during ascent.

The fluidic oscillator device used for this purpose contains a multiplicity of fluidic actuators (actuators in the sense of fluid mechanics) with two outlets. The discharge from the outlets takes place in an oscillating manner and is controlled by a fluidic control flow. This control flow is adapted in respect of pulsation frequency by a correspondingly configured common feedback line, said common feedback line being connected to each of the actuators.

SUMMARY

An aspect of the present disclosure is to provide an improved fluidic oscillator device.

According thereto, a fluidic oscillator device is provided, in particular for a or in a flow control system for an aircraft or spacecraft, having: a first and a second fluidic actuator, each of the actuators having an inlet for supplying pressure and a first and a second outlet, from which an actuator flow can be discharged; and a fluidic control for controlling an oscillating discharge of the actuator flow from the first and second outlet of the actuators, the control having a connection portion which is arranged between the first actuator and the second actuator.

A fundamental idea of the present disclosure is that a fluidic control having a connection portion, arranged between the fluidic actuators, is provided between adjacent fluidic actuators. As a result, it is advantageously possible to dispense with a common feedback line for supplying the individual actuators with a control flow. Instead, a fluidic control which is integrated into the construction or arrangement of the actuators is created by the connection portions.

In this respect, the control fluidically connects the actuators, thereby enabling the fluidic control of the actuators. In particular, the control connects the actuators fluidically and mechanically. This allows very compact construction of the oscillator device.

The control is for example configured as a purely fluidic control. Therefore, in particular it dispenses with mechanical control actuators.

An oscillator device according to the disclosure herein thereby advantageously allows a space-saving construction, particularly without the need for external feedback lines, for coupling together a plurality of fluidic actuators, it being possible for the entire oscillator device to be induced to produce resonant vibrations.

On the other hand, the oscillator device can advantageously also be expanded modularly by further actuators and further connection portions, which is made possible by an alternating construction of the actuators and connection portions of the oscillator device. Therefore, the oscillator device can be used universally.

Furthermore, according to the disclosure herein, the modular construction makes it possible to easily realize adaptations of the blow-out characteristic, for example of an oscillation frequency and/or of a blow-out pattern or of an arrangement of the simultaneously active outlets. In particular, the control or the connection portion thereof can be configured such that a multiplicity of desired blow-out patterns can be generated in a row of a plurality of actuators. In particular, the configuration can be provided such that the actuator flows, discharged at the outlets of the actuators, hold phase relative to one another.

For example, to change the blow-out characteristic, the connection portion between the actuators can simply be exchanged or replaced by another connection portion, suitable for the altered blow-out characteristic.

According to a development, the control comprises a control channel in each actuator, a control flow, which can be guided through the control channel, determining the outlet of the actuator which is active in each case. The control channels respectively have a first and a second junction at the actuators. Furthermore, the connection portion has a first and a second connection channel. The connection channels fluidically interconnect the junctions of the control channels. The connection channels thus advantageously provide a direct fluidic connection of the actuators. The control channels and the connection portion arranged between the actuators thereby respectively form part of a common or jointly oscillating fluidic control which acts in particular as a feedback of the oscillator device.

According to an advantageous embodiment, the connection portion also has a bypass channel which provides a fluidic connection between the first and the second connection channel. The bypass channel is configured such that the actuators and the control can be operated at an oscillation frequency. In this respect, the connection of the connection channels via the bypass channel advantageously allows the realization of a fluidically oscillating system of the entire control (with control channels, connection channels and bypass channel). It is thereby advantageously possible to realize many varied blow-out patterns at the outlets of the actuators. In particular, the oscillation frequency is a common oscillation frequency of the actuators and of the control. Synchronous blow-out patterns are thereby advantageously made possible without a time offset, for example in-phase parallel or in-phase offset blow-out patterns. Particularly advantageously, in one embodiment, the oscillations, controlling the actuator flow, of the control are applied to the individual actuators in a phase-holding manner or without a time offset, because the oscillating system of the control oscillates synchronously at or between the actuators. Furthermore, the bypass channel can have very varied configurations which are adapted to the desired control and/or blow-out characteristic. It would also be conceivable to provide a plurality of bypass channels.

According to one embodiment, the actuators and the connection portion are configured as flat parts. In particular, they are flat parts which are interconnected in a force-locking manner. The actuators and connection portions are thus advantageously stackable, in particular without any interspaces. This provides a very compact construction. Furthermore, a form supplementation of the stacked elements, in particular of the connection portion can be realized by stacking. Furthermore, it is consequently also possible to expand in modular fashion the oscillator device by expanding the stack. In addition, the force-locking connection, which can be provided, for example, by connecting bolts, allows a reversibility of the connection and thus a simple exchangeability of individual components. At the same time, the channel system of the control is closed by the force-locking connection. In particular, a connection of the control channel and of the connection channels is closed in this way. Furthermore, the actuators and the connection portion can be supplemented to form the channel system, in particular to form the bypass channel and/or the connection channels. Alternatively or additionally, it would also be possible to connect the flat parts in a form-locking or integral manner. Furthermore, it would also be conceivable for only one or for both actuators to be formed as flat parts or for only the connection portion to be formed as a flat part.

According to an advantageous development, the bypass channel is configured as a groove which is introduced into the connection portion formed as a flat part. Therefore, the connection portion with the bypass channel is advantageously formed without undercuts and is thus easy to manufacture, for example by a machining method, by 3D printing (ALM), by injection molding or laser sintering. In particular, the groove is closed to form a channel with the actuators as a result of stacking.

According to a further development, the groove runs in a first side and in a second side of the flat part, a passage through the flat part being provided. Thus, the length and volume of the bypass channel can advantageously be greater than in the case of a unilateral configuration. The bypass channel can thus be advantageously adapted in a wider region to adjust a desired blow-out characteristic, in particular of different oscillation frequencies of the oscillator device.

According to a further development, the bypass channel describes or comprises at least one curve. In particular, the bypass channel can describe or comprise a plurality of curves arranged in a serpentine-like manner. A curve of this type can be configured in particular as a 180° curve. Other curve angles are also possible. The curve can also be provided to form a loop, in particular a 180° loop of the bypass channel. A plurality of curves of the bypass channel can also run through the connection portion in different spatial directions and/or as a passage. An extended length of the bypass channel can advantageously be realized thereby.

According to one embodiment, the first junction of the control channel is arranged on a first side of the respective actuator and the second junction of the control channel is arranged on a second side of the respective actuator. The inlet is arranged for example centrally in the actuator and leads into a common chamber, out of which the first and second outlet of the actuator are guided in different directions with an opposite transverse component. The control channel is arranged, for example, such that the control flow passes transversely through the chamber and thereby determines, subject to the flow direction of the control flow, from which of the outlets the actuator flow issues. The junctions of the control channel are for example oriented in the stack direction, i.e. in the direction towards the connection portion.

In one embodiment, the first junction of the control channel of the first actuator is connected to the first junction of the control channel of the second actuator by the first connection channel of the connection portion. Alternatively or additionally, the second junction of the control channel of the first actuator is connected to the second junction of the control channel of the second actuator by the second connection channel of the connection portion. This provides a parallel interconnection of the control channels. This makes it possible to advantageously realize blow-out patterns which in particular run in the same direction.

In one development, the first connection channel leads through the connection portion on a first side of the connection portion. Alternatively or additionally, the second connection channel leads through the connection portion on a second side of the connection portion. In this respect, the connection channel can be advantageously realized with an easily producible hole. In particular, the first and second connection channels can be two parallel holes.

According to a further embodiment, the first junction of the control channel of the first actuator is connected to the second junction of the control channel of the second actuator by the first connection channel of the connection portion. Alternatively or additionally, here the second junction of the control channel of the first actuator is connected to the first junction of the control channel of the second actuator by the second connection channel of the connection portion. This provides a diagonal or crossover connection of the control channels. This makes it possible to advantageously realize blow-out patterns at the outlets which in particular run in opposite directions.

In this respect, one development provides that the first connection channel leads through the connection portion from a first side of the connection portion to a second side. Alternatively or additionally, the second connection channel leads through the connection portion from the second side of the connection portion to the first side. The connection channels thus respectively run diagonally or crosswise from a front side to a rear side of the connection portion. This can be realized, for example, in that the first connection channel runs in the form of a groove in a first direction from the first side of the connection portion and is formed with a passage to the rear side through the flat part of the connection portion in an area which is provided with an adequate distance from the second connection channel, for example in the centre. On the rear side, the groove continues to run to the second side of the connection portion. Correspondingly, the second connection channel runs as a groove through the flat part of the connection portion in a second direction from the second side of the connection portion with a passage in an area provided with an adequate distance from the first connection channel, for example in the centre. On the rear side, the second connection channel then runs as a groove from the passage to the first side of the connection portion. A diagonal connection of the actuators is thus advantageously provided, without requiring any additional installation space.

According to an advantageous embodiment, at least a third fluidic actuator and at least a second connection portion are provided, the second connection portion being arranged between the second actuator and the third actuator and interconnecting them fluidically. This is therefore an oscillator device which can be expanded modularly by individual actuators. It is possible to expand the device by a fourth, fifth and/or by further actuators and by a third, fourth or by further connection portions.

Alternatively or additionally, a plurality of further fluidic actuators and a plurality of further connection portions can also be provided, in which case respectively one of the further connection portions is arranged between respectively two of the further actuators and interconnects them fluidically, In this respect, in particular packets of first and second actuators, respectively connected by a connection portion, can be stacked together. Thus, a modular expandability of the oscillator device by any number of such packets is possible.

According to an advantageous embodiment, in the case of at least one of the actuators, one of the first and the second outlets has a start outlet configuration which allows the actuator flow to discharge through this outlet at the beginning of a pressurization procedure of the actuator. At the beginning of the pressurization procedure, there is still no control flow in the control, because the control flow is only activated by the actuator flow and the control is thus set into fluidic oscillation. Therefore, the start outlet configuration defines a starting state of the actuator flow. In particular, the actuator flow mainly issues from the outlet provided with the start outlet configuration at the beginning of the pressurization procedure, i.e. without a control flow being present. Therefore, this is a preferred outlet. A complete discharge from this outlet without the presence of a control flow would also be conceivable. In this way, a plurality of actuators and/or a plurality of oscillator devices can advantageously be synchronised together.

According to one development, the start outlet configuration comprises a lower fluidic resistance than the configuration of the other outlet of the actuator. The start outlet configuration can be in particular a greater passable cross section. The start outlet configuration can be integrated in particular into a nozzle arrangement attached to the actuator. Alternatively or additionally, it would also be conceivable to provide in the actuator chamber a flow-conducting element, forming or assisting the start outlet configuration and/or a form of the outlet itself which prefers the outlet without the presence of a control flow.

The above embodiments and developments can be combined together in any meaningful manner. Further possible embodiments, developments and implementations of the disclosure herein also include combinations, not mentioned explicitly, of features of the disclosure herein which have been described previously or are described in the following with regard to the embodiments. In particular, a person skilled in the art will also add individual aspects as improvements or supplements to the respective basic form of the present disclosure.

In the following, the disclosure herein will be described in more detail on the basis of embodiments with reference to the accompanying figures of the drawings. The elements of the drawings are not necessarily shown true to scale relative to one another.

BRIEF DESCRIPTION OF THE DRAWINGS

In the drawings:

FIG. 7A is a perspective assembled view of the oscillator device according to a further embodiment in a first state;

FIG. 7B is a diagram of a flow velocity profile at the outlets of the oscillator device according to FIG. 7A;

FIG. 7C shows the oscillator device according to FIG. 7A in a second state;

FIG. 7D is a diagram of a flow velocity profile at the outlets of the oscillator device according to FIG. 7C;

FIG. 8A is a perspective front view of a connection portion for an oscillator device according to FIG. 6A through D;

FIG. 8B is a rear view of the connection portion according to FIG. 8A;

FIG. 8C is a cross-sectional view of the connection portion according to FIG. 8B along sectional line C;

FIG. 8D is a cross-sectional view of the connection portion according to FIG. 8B along sectional line D;

In the figures, the same reference signs denote identical or functionally identical components, unless indicated otherwise.

DETAILED DESCRIPTION

Figure 1:
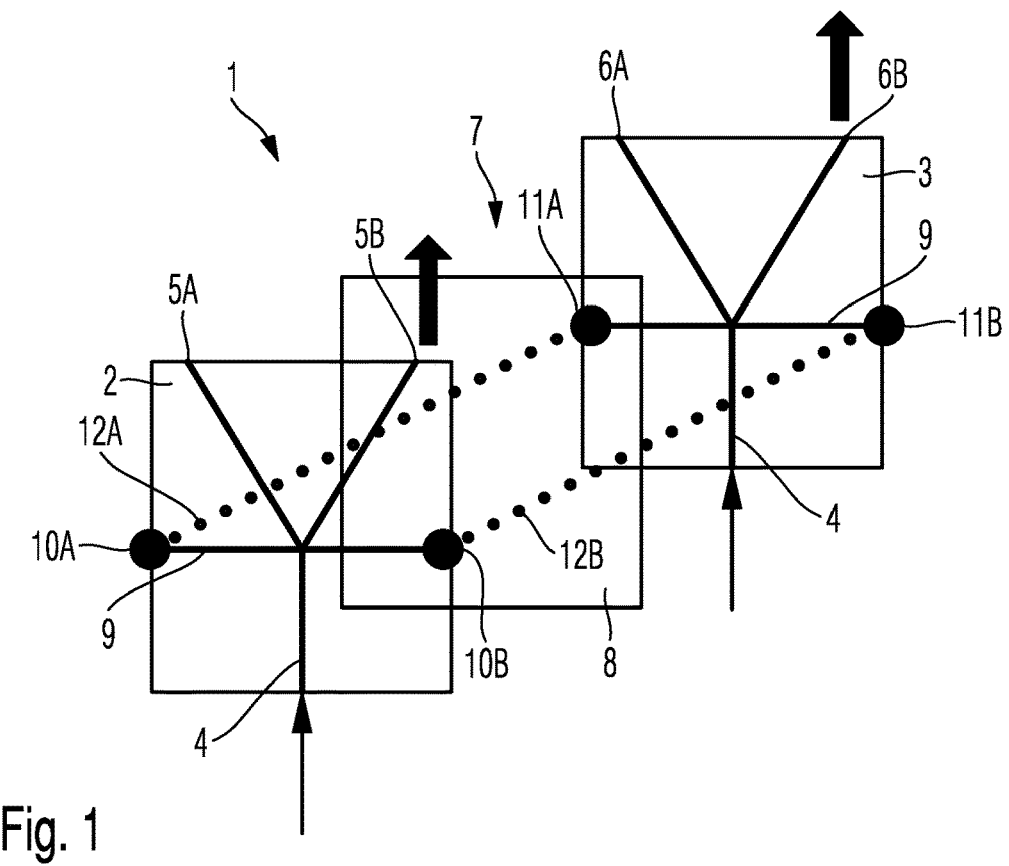
FIG. 1 schematically shows an oscillator device.

FIG. 1 schematically shows an oscillator device 1.

The oscillator device 1 has a first fluidic actuator 2, a second fluidic actuator 3 and a connection portion 8 arranged between the fluidic actuators 2, 3.

The fluidic actuators 2, 3 have a respective inlet 4, via which the respective actuator 2, 3 is supplied with pressure. Furthermore, the first actuator 2 has a first outlet 5A and a second outlet 5B. Likewise, the second actuator 3 has a first outlet 6A and a second outlet 6B. An actuator flow can be discharged through the outlets of the actuators 2, 3.

Provided in each of the actuators 2, 3 is a control channel 9 which acts as part of a fluidic control 7 and through which a control flow can be guided. The fluidic control 7 further comprises the connection portion 8 and serves to control an oscillating discharge of the actuator flow from the first and second outlets 5A, 5B and 6A, 6B of the actuators 2, 3. In this respect, the control flow determines which of the first and second outlets 5A, 5B and 6A, 6B of the respective actuator is active in each case.

The control channels 9 respectively have a first junction 10A, 11A and a second junction 10B, 11B. Furthermore, the connection portion 8 has a first connection channel 12A and a second connection channel 12B. The junctions 10A, 10B, 11A, 11B of the control channels 9 are fluidically interconnected by these connection channels 12A, 12B.

In the embodiment shown, the first connection channel 12A fluidically connects the first junction 10A of the control channel 9 of the first actuator 2 to the first junction 11A of the control channel 9 of the second actuator 3. The second connection channel 12B fluidically connects the second junction 10B of the control channel of the first actuator 2 to the second junction 11B of the control channel 9 of the second actuator 3. The control channels 9 of the first and second actuators 2, 3 are thus connected in parallel with one another.

This means that an excess pressure or a vacuum respectively prevails in parallel in the control 7 in the same area of the control channels, so that in each case the first outlets 5A, 6A or the second outlets 5B, 6B of the actuators are simultaneously active. Arrows show a simultaneous activity of the second outlet 5B of the first actuator 2 and of the second outlet 6B of the second actuator 3.

Figure 2:
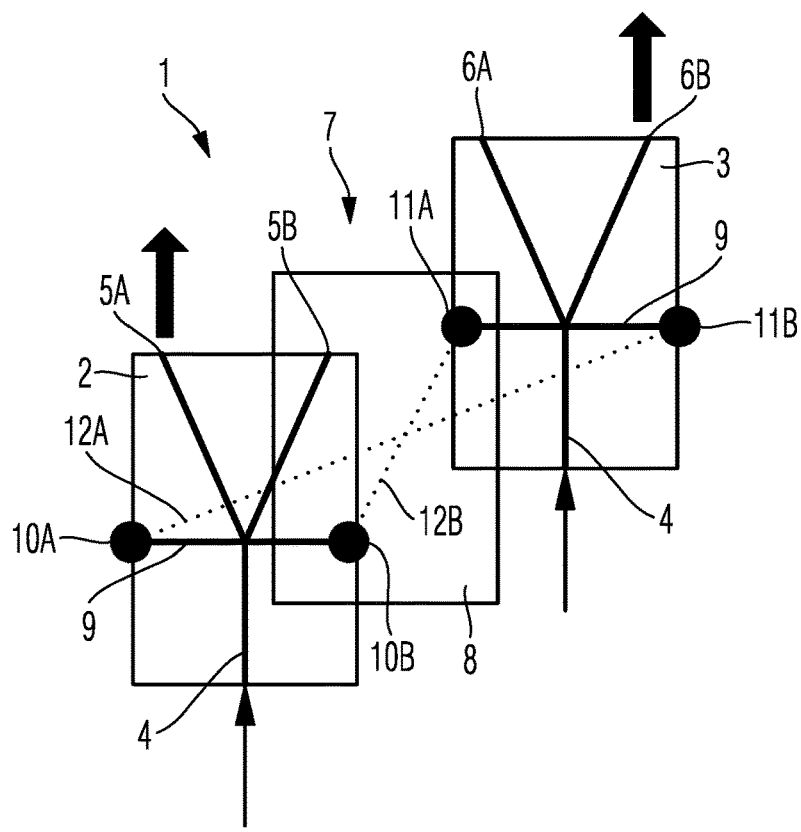
FIG. 2 schematically shows an oscillator device according to a further embodiment.

FIG. 2 schematically shows an oscillator device 1 according to a further embodiment.

Here, in contrast to the embodiment according to FIG. 1, the control channels 9 of the first and second actuators 2, 3 are connected diagonally. Otherwise, the construction which is shown of the oscillator device 1 is the same as the oscillator device 1 shown in FIG. 1.

This diagonal or crossover connection is realized in that the first connection channel 12A fluidically connects the first junction 10A of the control channel 9 of the first actuator 2 to the second junction 11B of the control channel 9 of the second actuator 3. The second connection channel 12B fluidically connects the second junction 10B of the control channel 9 of the first actuator 2 to the first junction 11A of the control channel 9 of the second actuator 3.

As a result, an excess pressure or vacuum respectively prevails in the control 7 on the opposite side of the control channels 9 of the respective actuators 2, 3. Opposite outlets 5A, 6B or 5B, 6A of the two actuators 2, 3 are thus respectively simultaneously active. Arrows show a simultaneous activity of the second outlet 5B of the first actuator 2 and of the first outlet 6A of the second actuator 3.

Figure 3:
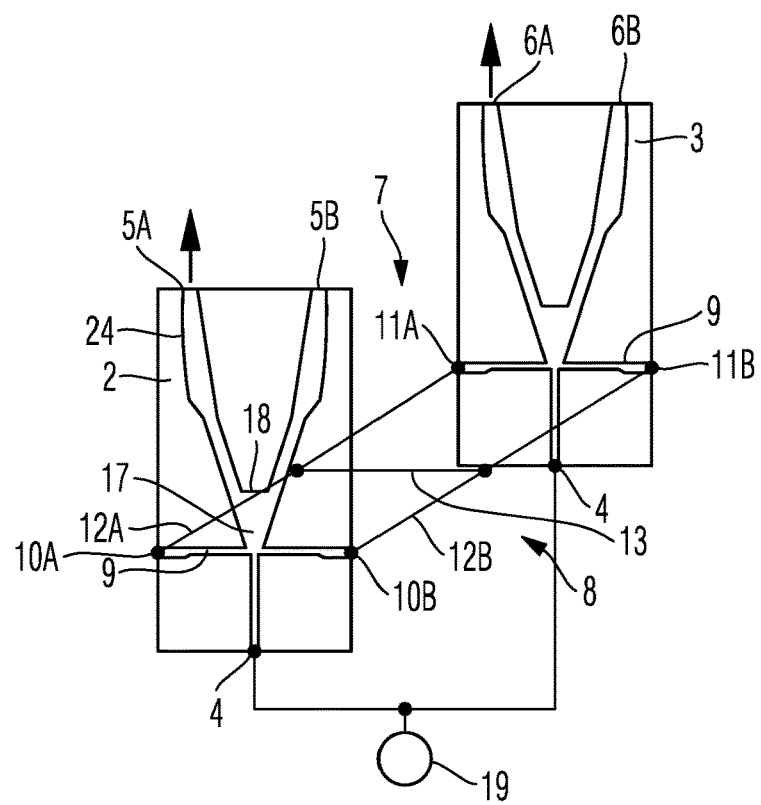
FIG. 3 is a perspective view of an arrangement of two actuators, schematically showing the interconnection of the connection portion.

FIG. 3 is a perspective view of an arrangement of two actuators 2, 3, schematically showing the interconnection of the connection portion 8.

The interconnection of the inlets 4 is schematically shown in addition to the interconnection of the connection portion 8. The inlets are connected to a common pressure source 19.

Here, the actuators 2, 3 are shown in cross section, it being possible to see the internal course of the flow channels and of the control channel 9. In the following, the course is described by way of example based on the first actuator 2, both actuators being of an identical construction.

The first junction 10A of the control channel 9 of the first actuator 2 is arranged on a first side of the actuator 2 and the second junction 10B of the control channel 9 is arranged on a second side of the actuator 2.

An inlet 4 for supplying pressure to the actuator 2 is arranged in the centre of the actuator 2. The inlet 4 runs into a common chamber 17 which is traversed by the control channel 9 and out of which lead the first and second outlets 5A, 5B of the actuator 2 in different directions with an opposite transverse component. The first outlet 5A runs out of the chamber with a direction component oriented to the left in the drawing, while the second outlet 5B runs out of the chamber with a direction component to the right.

The chamber 17 contains a deflector device 18 for deflecting a pressure supply flow which enters centrally through the inlet 4, so that after deflection, an actuator flow issues through one of the outlets 5A, 5B.

A respective convex widening 24 is provided in the course of the outlets 5A, 5B. This widening serves to homogenise the actuator flow or jets which are discharged from the respective outlet.

During operation, the pressure supply flow generates a vacuum in the control channel 9, thereby causing a fluidic oscillation of the control 7. Due to this oscillation of the control 7, a control flow which flows in the control channel 9 changes its flow direction in a regularly oscillating manner. For this, the control flow passes transversely through the chamber 17 and, subject to the flow direction of the control flow, thus determines the respectively active outlet. For this purpose, the control flow deflects the pressure supply flow sufficiently to cause a deflection for the pressure supply flow into the first outlet 5A or into the second outlet 5B. An actuator flow thus issues in an oscillating manner alternately through the first outlet 5A or through the second outlet 5B.

In the embodiment shown here, the control 7 is also formed with the control channels 9 and the connection portion 8. As in the embodiment according to FIG. 1, the connection channels 12A, 12B of the connection portion 8 are fluidically connected in parallel with the first and second junctions of the control channels 9 of the first actuator 2 and of the second actuator 3.

Also in this embodiment, the connection portion 8 has a bypass channel 13 which provides a fluidic connection between the first connection channel 12A and the second connection channel 12B. The bypass channel 13 is provided to allow an in-phase oscillation of the actuators 2, 3. For this purpose, the connection of the connection channels 12A, 12B via the bypass channel 13 has a configuration, in particular a corresponding length and/or a corresponding volume, which allows an in-phase fluidic oscillation of the system of the entire control (with control channels, connection channels and bypass channel) without a time offset.

Figure 4:
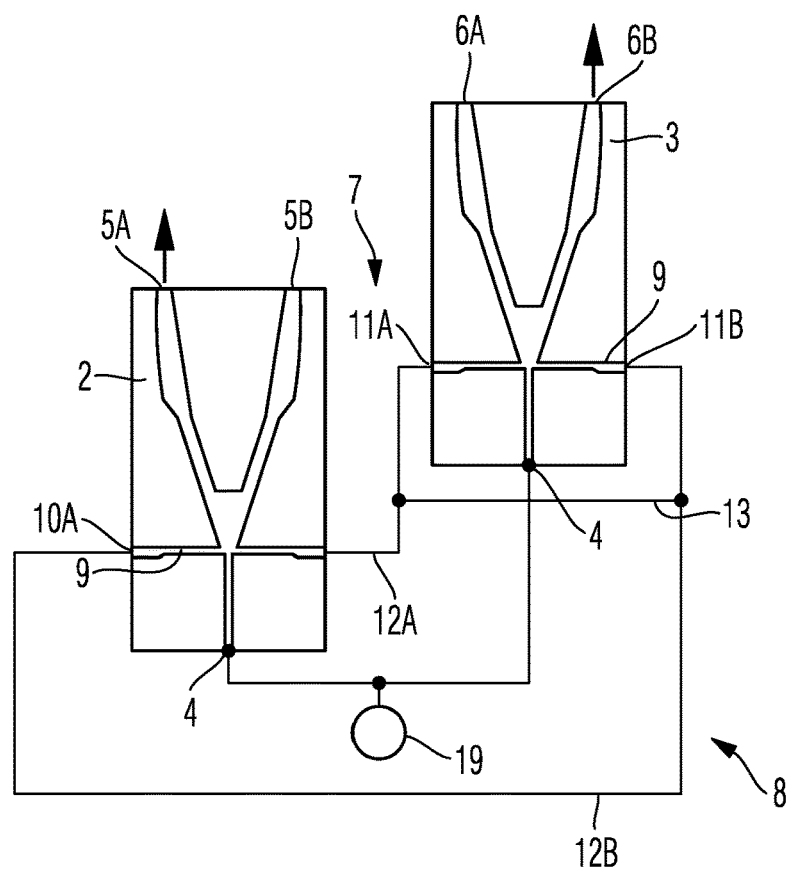
FIG. 4 is a perspective view of an arrangement of two actuators, schematically showing the interconnection of the connection portion according to a further embodiment.

FIG. 4 is a perspective view of an arrangement of two actuators 2, 3 with a schematic illustration of the connection of the connection portion 8 according to a further embodiment.

The two actuators 2, 3 and the interconnection of the inlets 4 are configured in the same way as described with respect to FIG. 3.

The interconnection of the connection portion 8 differs here in that the connection channels 12A, 12B of the connection portion 8, as in the embodiment according to FIG. 2, are fluidically connected diagonally to the first and second junctions of the control channels 9 of the first actuator 2 and of the second actuator 3. For the sake of clarity, the second connection channel 12B has been shown here in an encircling manner instead of crosswise. However, in functional terms, this is a crossover connection of the first and second connection channels 12A, 12B. Accordingly, here the bypass channel 13 connects the diagonally or crosswise interconnected connection channels 12A, 12B.

Figure 5:
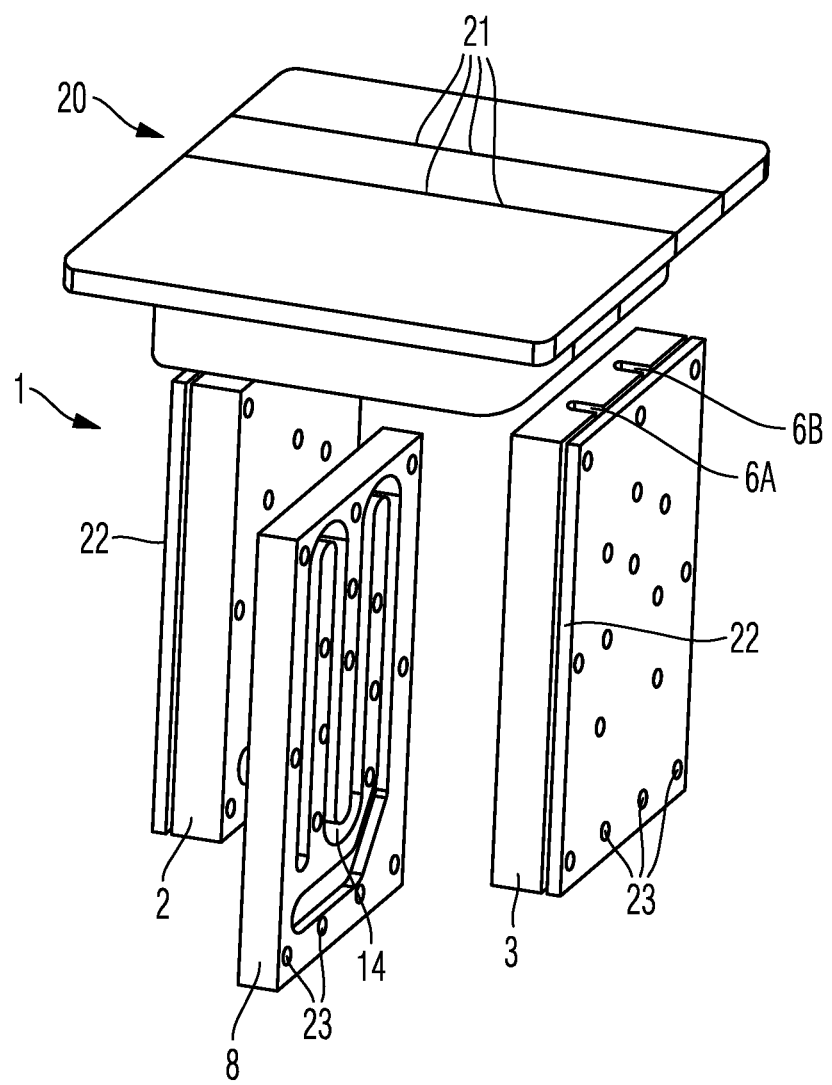
FIG. 5 is a perspective exploded view of an oscillator device.

FIG. 5 is a perspective exploded view of an oscillator device 1.

In the embodiment shown here, the oscillator device contains a first actuator 2, a second actuator 3 and a connection portion 8 arranged between the actuators. Furthermore, end plates or connection plates 22 outwardly covering the actuators 2, 3 are provided.

Here, the actuators 2, 3 and the connection portion 8 are configured as flat parts which can be stacked together and can be connected in a force-locking manner by connecting bolts. Through-holes 23 are provided in the end plates or connection plates 22, in the actuators 2, 3 and in the connection portion 8 for the force-locking connection.

The bypass channel 13 is introduced as a groove 14 into the connection portion 8 configured as a flat part, which will be described in more detail with reference to FIGS. 8 and 9. Here, the connection portion 8 is provided by way of example according to FIG. 3 with a parallel interconnection of the control channels 9 of the actuators 2, 3 so that during operation, the first outlets 5A, 6A and the second outlets 5B, 6B are respectively active in the same direction. Alternatively, a connection portion 8 which is interconnected according to FIG. 4 can also be provided with a diagonal interconnection.

Furthermore, a nozzle arrangement 20 is provided which provides a canalization of the actuator flow to be discharged as a thin, linear flow or jet through an outlet slit 21. A number of outlet slits 21 is provided which corresponds to the number of outlets of the oscillator device, here, four outlet slits 21.

The nozzle arrangement 20 is configured to be attached on the end face of the force-locking assembly of actuators 2, 3, connection portion 8 and end plates or connection plates 22 which has the outlets 5A, 5B, 6A, 6B. The nozzle arrangement 20 can also be integrated into the surface of a flow body of an aircraft or spacecraft to realize a flow control system.

Figure 6A:
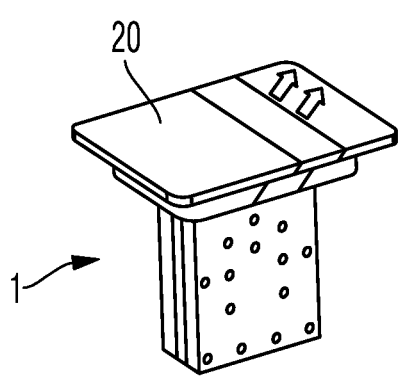
FIG. 6A is a perspective assembled view of the oscillator device according to FIG. 5 in a first state.

FIG. 6A is a perspective assembled view of the oscillator device according to FIG. 5 in a first state.

The outlets of the oscillator device 1 which are active in the first state are shown here schematically by arrows emanating from the outlet slits 21, the second outlets 5B, 6B being active, holding phase in the same direction. This is realized by a connection portion 8 which connects the control channels 9 of the actuators 2, 3 in parallel.

The first state is, for example, a state with an oscillation phase angle of 0°.

Figure 6B:
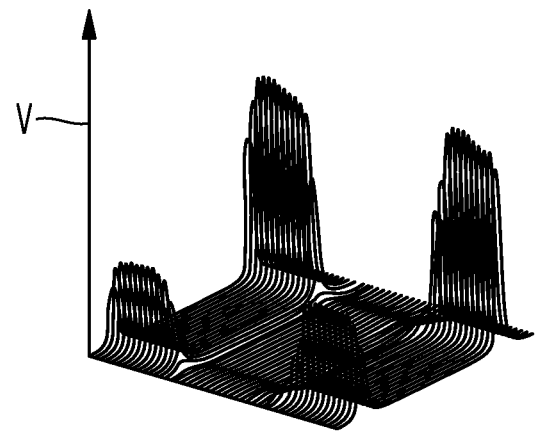
FIG. 6B is a diagram of a flow velocity profile at the outlets of the oscillator device according to FIG. 6A.

FIG. 6B shows a diagram of a flow velocity profile at the outlets of the oscillator device according to FIG. 6A.

A flow velocity profile of this type is also known as a blow-out pattern and is created by the hot wire or heating wire measuring method, also known as hot wire anemometry. For this purpose, a thin metal wire which is attached to a test head of an oscillator device 1 is heated by a constant temperature anemometer to a measurement temperature which is significantly above the temperature of the fluid or air of the issuing actuator flow. The resistance of the thin wire depends greatly and almost linearly on the temperature of the wire. In this respect, the temperature of the wire is a function of the flow velocity v due to cooling effects by convection. When the hot wire is cooled, what is known as a Wheatstone Bridge in the test setup increases the voltage present on the wire to restore the measurement temperature. The change in voltage which can be measured in this way is in particular directly proportional to the change in the flow velocity v.

If a multiplicity of such measurements are made over a field of measurement points, for example 40×40 measurement points, a velocity profile which is shown here can be derived therefrom. The measurement can be carried out, for example, using a measuring device which is positioned across several phases at the different measurement points.

Here, the flow velocity profile is shown at a first oscillation phase angle of for example 0°. For example, a flow velocity profile of this type can be measured at the oscillator device with an oscillation frequency of 275 Hz and a volume flow of 120 litres per minute.

It can be seen that the two second outlets 5B, 6B, indicated by arrows in FIG. 6A, are active here and they have a significantly higher outflow velocity v than the two first outlets 5A, 6A.

Figure 6C:
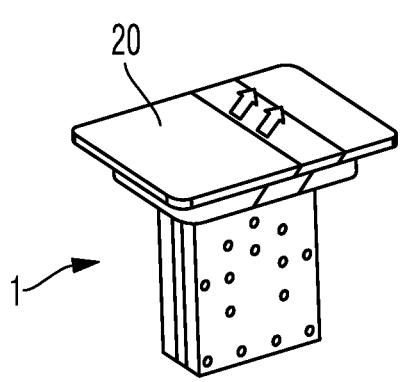
FIG. 6C shows the oscillator device according to FIG. 6A in a second state.

FIG. 6C shows the oscillator device according to FIG. 6A in a second state.

In this respect, the oscillation phase angle is offset by half a phase compared to the first state, for example 180°.

The active outlets of the oscillator device 1 are shown schematically here by arrows emanating from the outlet slits 21, the first outlets 5A, 6A being active, holding phase in the same direction.

Figure 6D:
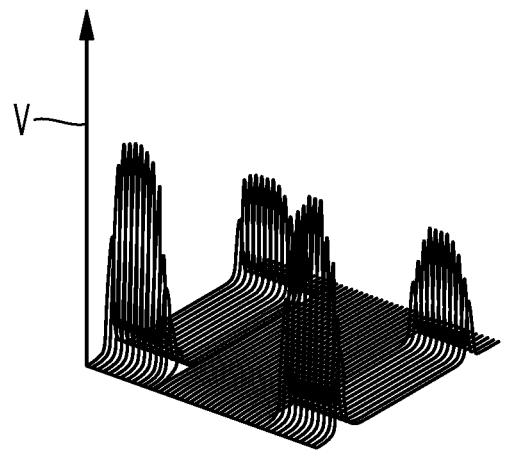
FIG. 6D is a diagram of a flow velocity profile at the outlets of the oscillator device according to FIG. 6C.

FIG. 6D shows a diagram of a flow velocity profile at the outlets of the oscillator device according to FIG. 6C.

Here, the flow velocity profile is shown at the second oscillation phase angle, for example 180°. It can be seen that the two first outlets 5A, 6A, identified by arrows in FIG. 6C, are active here and accordingly have a significantly higher outflow velocity v than the two second outlets 5B, 6B.

FIG. 7A is a perspective assembled view of the oscillator device 1 according to a further embodiment in a first state.

According to the embodiment shown here, a diagonally interconnected connection portion 8 which is different from FIG. 6A to 6D, as described with reference to FIG. 4, is arranged between the actuators 2, 3. Accordingly, here the outlets 5A, 5B, 6A, 6B are active, holding phase in opposite directions.

A discharge thus respectively takes place simultaneously at a first phase angle, for example 0°, from the first outlet 5A of the first actuator 2 and from the second outlet 6B of the second actuator 3 and also at a second phase angle, for example 180°, at the same time from the second outlet 5B of the first actuator 2 and from the first outlet 6A of the second actuator 3.

The first state shown here represents the state of the first oscillation phase angle, which is for example 0°.

FIG. 7B shows a diagram of a flow velocity profile at the outlets of the oscillator device according to FIG. 7A.

Accordingly, here the flow velocity profile is shown at the first oscillation phase angle, for example 0°. It can be seen that the two outlets 5A, 6B, identified by arrows in FIG. 7A, are active here and have a significantly higher outflow velocity v than the two other outlets 5B, 6A.

FIG. 7C shows the oscillator device according to FIG. 7A in a second state.

In the second state which is shown, the oscillation phase angle is offset by half a phase compared to the first state, for example 180°.

The outlets of the oscillator device 1 which are active in the second state are shown schematically here by arrows emanating from the outlet slits 21, these being the second outlet 5B of the first actuator and the first outlet 6B of the second actuator.

FIG. 7D shows a diagram of a flow velocity profile at the outlets of the oscillator device according to FIG. 7C.

Accordingly here the flow velocity profile is shown at the second oscillation phase angle, for example 180°. It can be seen that the two outlets 5B, 6A, identified by arrows in FIG. 7C, are active here and have a significantly higher outflow velocity v than the two other outlets 5A, 6B.

FIG. 8A is a perspective front view of a connection portion 8 for an oscillator device 1 according to FIGS. 5 and 6A, 6B.

The connection portion 8 has a first connection channel 12A, a second connection channel 12B and a bypass channel 13.

As described with reference to FIG. 5, the connection portion 8 is configured as a flat part. For example, it is a flat aluminium part which, for example is machined, in particular by milling, to produce the shape of the channels. Other materials and other production processes are possible.

The first connection channel 12A is arranged in a first side A of the connection portion 8 and is configured as a through-hole. For this purpose, it is provided to fluidically connect a first junction 10A of a flow channel 9 of a first actuator 2 to a first junction 11A of a flow channel 9 of a second actuator 3.

The second connection channel 12B is arranged in a second side B of the connection portion 8 and is also configured as a through-hole. For this purpose, it is provided to fluidically connect a second junction 10B of a flow channel 9 of a first actuator 2 to a second junction 11B of a flow channel 9 of a second actuator 3.

The bypass channel 13 connects the two connection channels 12A, 12B and is configured as a groove 14 which is introduced, in particular milled, into the material of the connection portion 8, configured as a flat part. The groove 14 runs from the first connection channel 12A, with a plurality of curves 16 in a serpentine manner over the front side shown here. Furthermore, a passage 15 is provided, through which the bypass channel 13 continues in a rear side of the connection portion 8. The bypass channel thus runs from the first side A of the connection portion 8 along the front side and rear side to the second side B of the connection portion 8.

FIG. 8B is a rear view of the connection portion according to FIG. 8A.

It can be seen that the bypass channel 13 initially runs on the rear side also with a plurality of curves 16 in a serpentine-like manner over the rear side and finally arrives at the second connection channel 12B.

FIG. 8C is a cross-sectional view of the connection portion according to FIG. 8B along sectional line C.

The sectional line C passes through the second connection channel 12B which is arranged in the second side B of the connection portion 8 and is configured as a through-hole, and also passes through the opening 15. The course of the bypass channel 13 in the front side and rear side of the connection portion 8 configured as a flat part can also be seen.

FIG. 8D is a cross-sectional view of the connection portion according to FIG. 8B along sectional line D.

The sectional line D passes through the first connection channel 12A which is arranged in the first side A of the connection portion 8 and is configured as a through-hole. The course of the bypass channel 13 in the front side and rear side of the connection portion 8 configured as a flat part can also be seen here.

Figure 9A:
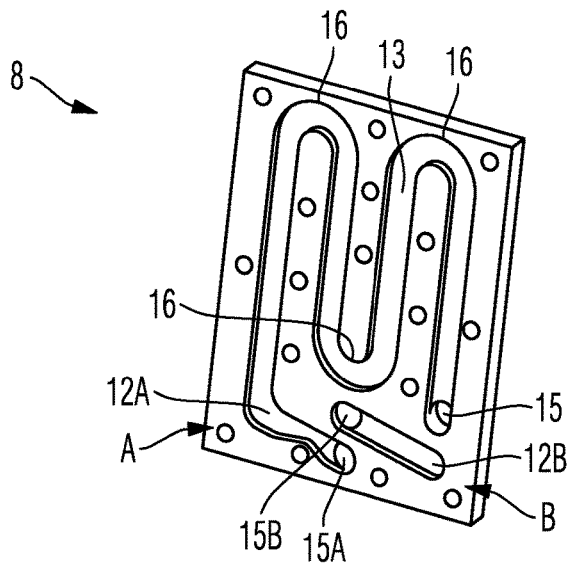
FIG. 9A is a perspective view of a connection portion for an oscillator device according to FIG. 7A through D.

FIG. 9A is a perspective front view of a connection portion for an oscillator device according to FIG. 7A, 7B.

Here, the connection portion 8 also has a first connection channel 12A, a second connection channel 12B and a bypass channel 13. Apart from a few geometric differences, the bypass channel 13 is substantially of the same configuration as described with reference to FIG. 8A through D, with a serpentine-like course on the front side and rear side and with a passage 15A.

Here however, unlike the embodiment according to FIG. 8A through D, the connection channels 12A, 12B run diagonally or crosswise. Thus, here the bypass channel 13 runs from the first side A of the connection portion 8 over the front and rear sides thereof and on the rear side again, back to the first side A.

The first connection channel 12A runs along the front side, shown here, of the connection portion 8 from the first side A of the connection portion 8 to a centrally arranged lower passage 15A which is configured as a through-hole. From the lower passage 15A, the first connection channel 12A continues along the rear side of the connection portion 8 to the second side B of the connection portion 8. Consequently, the first connection channel 12A is provided to fluidically connect a first junction 10A of a flow channel 9 of a first actuator 2 to a second junction 11B of a flow channel 9 of a second actuator 3.

The second connection channel 12B runs along the front side, shown here, of the connection portion 8 to a centrally arranged upper passage 15B which is configured as a through-hole. From the upper passage 15B, the second connection channel 12B continues along the rear side of the connection portion 8 to the first side A of the connection portion 8. Consequently, the second connection channel 12B is provided to fluidically connect a second junction 10B of a flow channel 9 of a first actuator 2 to a first junction 11A of a flow channel 9 of a second actuator 3.

The bypass channel 13 respectively connects the two connection channels 12A, 12B on the first side A and, for this, is connected to the first connection channel 12A on the front side and to the second connection channel 12B on the rear side.

Figure 9B:
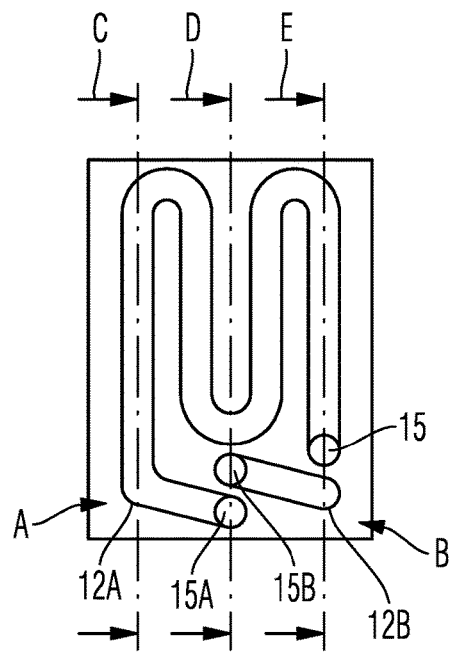
FIG. 9B is a front view of the connection portion according to FIG. 9A.

FIG. 9B is a front view of the connection portion according to FIG. 9A. Thus, the same side is shown as in FIG. 9A.

The sectional lines C, D and E of the cross-sectional views which are described in the following are shown here.

Figure 9C:
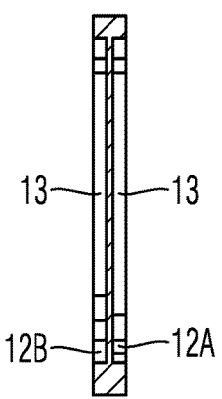
FIG. 9C is a cross-sectional view of the connection portion according to FIG. 9B along sectional line C.

FIG. 9C is a cross-sectional view of the connection portion according to FIG. 9B along sectional line C.

Sectional line C runs in the region of the first side A of the connection portion. As can be seen here, the two connection channels 12A and 12B are connected to the bypass channel 13. In this respect, the first connection channel 12A is connected to the bypass channel 13 on the front side, the second connection channel 12B being connected to the bypass channel 13 on the rear side.

Figure 9D:
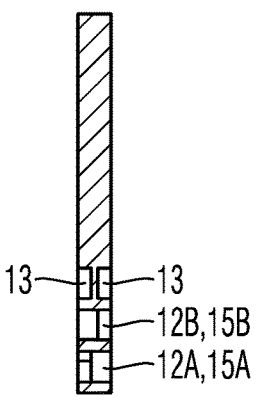
FIG. 9D is a cross-sectional view of the connection portion according to FIG. 9B along sectional line D.

FIG. 9D is a cross-sectional view of the connection portion according to FIG. 9B along sectional line D.

Sectional line D passes through the centre of the connection portion 8 and thus cuts through the lower passage 15A of the first connection channel 12A and through the upper passage 15B of the second connection channel 12B.

Figure 9E:
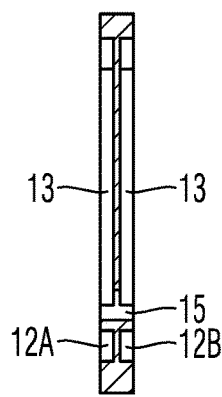
FIG. 9E is a cross-sectional view of the connection portion according to FIG. 9B along sectional line E.

FIG. 9E is a cross-sectional view of the connection portion according to FIG. 9B along sectional line E.

Sectional line E runs in the region of the second side B of the connection portion 8 and cuts through the passage 15 of the bypass channel 13. It can be seen that the connection channels are not coupled to the bypass channel 13 on the second side B, but only on the first side A.

Figure 10:
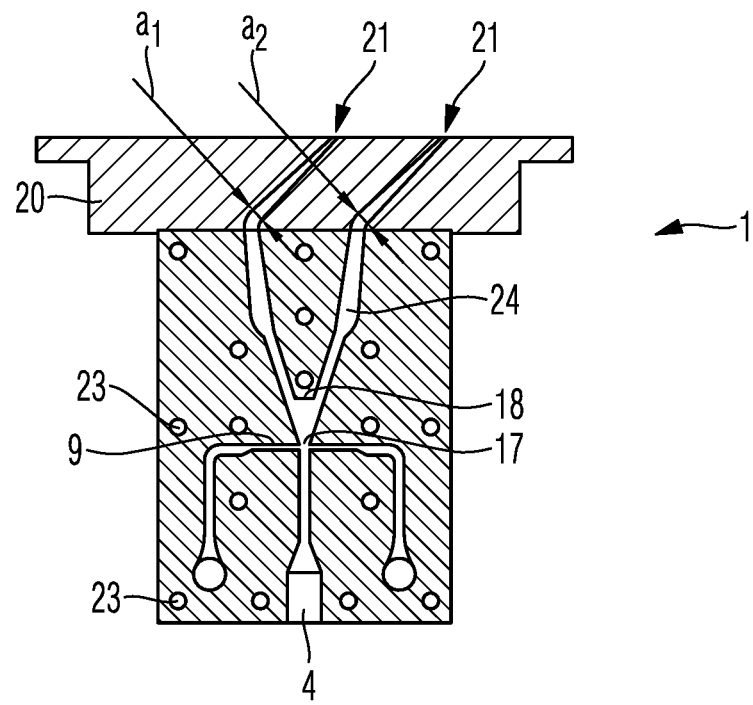
FIG. 10 is a longitudinal sectional view through an oscillator device in the region of an actuator.

FIG. 10 is a longitudinal sectional view through an oscillator device 1 in the region of an actuator.

The actuator which is shown can be a first actuator 2, a second actuator 3 or a further actuator of the oscillator device. The function of the actuator is the same as described with reference to FIG. 3.

Furthermore, the course of two outlets is shown here with the transition to the nozzle arrangement 20 and the course thereof as far as the outlet slits 21. In the region of the nozzle arrangement 20, the profile of the actuator flow changes from an approximately rectangular cross section to a slit-shaped cross section. The convex widenings 24 in the outlets are provided to advantageously influence the actuator flow such that it has the greatest possible homogeneity at the outlet from the outlet slits 21. In this way, the effectiveness of the oscillator device can be improved, particularly when used in a flow control system.

In the region of the nozzle arrangement 20, the outlets each have a diameter a1 and a2 of a passable cross section. The diameters a1 and a2 can differ slightly here. In this case, one of the outlets has a slightly larger passable cross section than the other. A difference of this type in the passable cross section also causes a slightly lower fluidic resistance of the larger outlet than in the case of the other outlet. In turn, the lower fluidic resistance of the outlet is a start outlet configuration which is provided to allow the actuator flow to issue through this outlet at the beginning of a pressurization of the actuator. Thus, the start outlet configuration is integrated into the nozzle arrangement attached to the actuator.

At the beginning of the pressurization, the start outlet configuration defines a starting state of the actuator flow in which the actuator flow mainly issues from the outlet provided with the start outlet configuration. It is provided because at the beginning of the pressurization of the actuator, there is still no control flow in the control. The control flow is caused only by the pressure supply flow, with the control being set into fluidic oscillation.

The position of the junctions of the control channel 9 is also shown here. They are located at the same height as the connection channels 12A, 12B according to FIG. 8A through D or 9A through E. Therefore, a connection of the connection channels 12A, 12B to the junctions of the control channel 9 is automatically provided in a stacking of a connection portion 8 with the actuator. A seal can be achieved by a firm force-locking connection by connecting bolts which are guided through the holes 23. In addition, another seal or a sealing device can optionally be provided between the connection portion 8 and the actuator.

Figure 11:
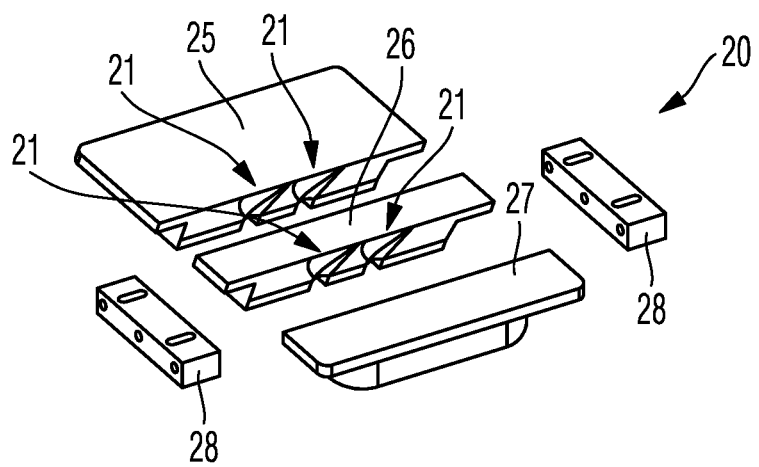
FIG. 11 is a perspective exploded view of a nozzle arrangement.

FIG. 11 is a perspective exploded view of a nozzle arrangement.

This is a multipart nozzle arrangement 20 which has two outer parts 25, 27, a middle part 26 and two connectors 28.

The individual parts of the nozzle arrangement can be produced, for example, by selective laser sintering, for example from polyamide. Other materials and other production processes are possible.

The nozzle contour is introduced, in particular milled into the lateral surfaces of the outer parts 25, 27 and of the middle part 26. The outer parts 25, 27 and the middle part 26 can be interconnected in a force-locking manner, in particular they can be screwed together.

The connectors 28 are configured to provide a connection between the nozzle arrangement 20 and the non-positively connected packet of actuators 2, 3 and connection portions 8. For this, the connectors 28 can be connected in a force-locking manner, for example screwed, in different directions to the nozzle arrangement 20 and to the packet of actuators 2, 3 and connection portions 8.

Figure 12:
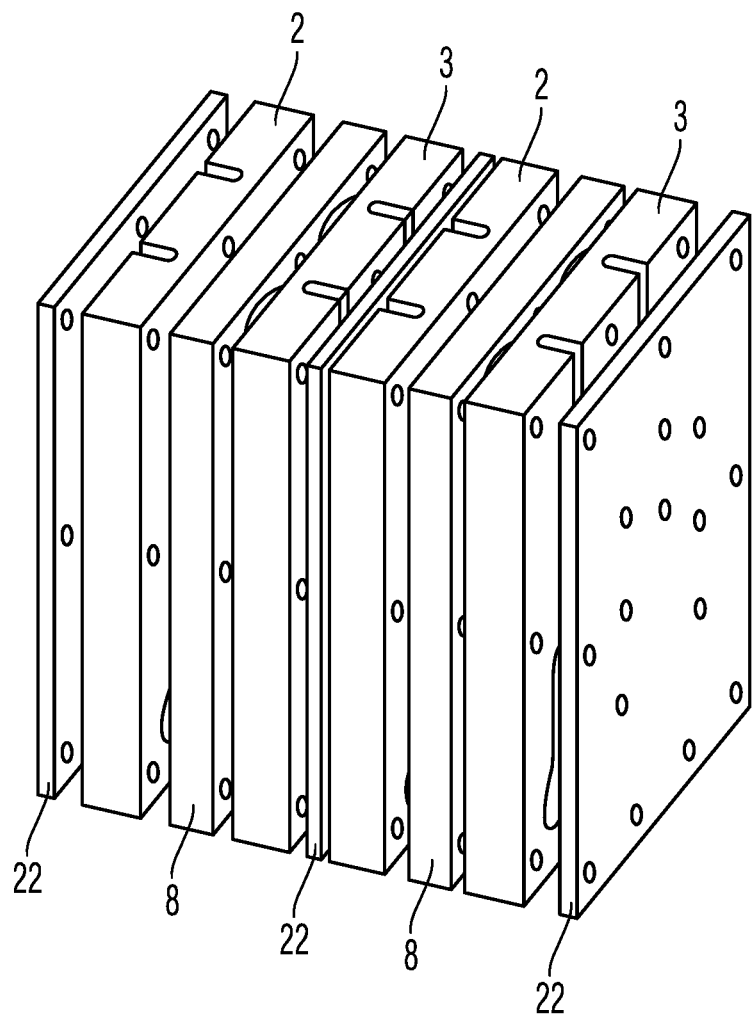
FIG. 12 is a perspective exploded view of an oscillator device having a plurality of further actuators and connection portions.

FIG. 12 is a perspective exploded view of an oscillator device 1 with a plurality of further actuators 2, 3 and connection portions 8.

The drawing shows two stacked packets, each with a first and a second actuator 2, 3, an interposed connection portion 8 and two outer end plates or connection plates 22 and one end plate or connection plate arranged between the packets, in particular between the second actuator of a first packet and the first actuator of a second packet.

The oscillator device 1 can be expanded by any number of further packets.

Figure 13:
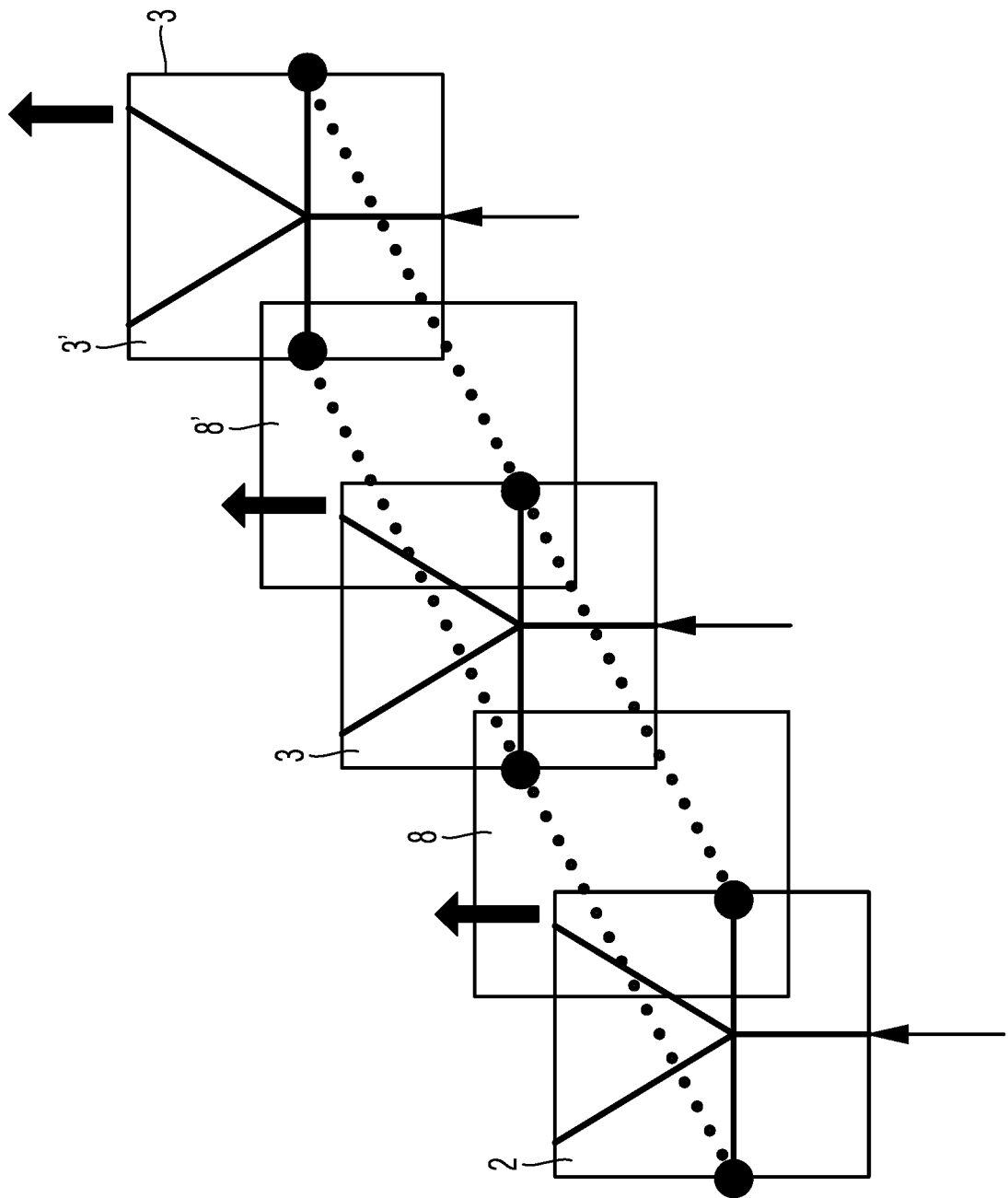
FIG. 13 schematically shows an oscillator device having a second connection portion and a third actuator.

FIG. 13 schematically shows an oscillator device 1 with a second connection portion 8' and a third actuator 3'.

The oscillator device 1 shown here is based on the oscillator device 1 described with reference to FIG. 1 and has been expanded by a second connection portion 8' and by a third actuator 3'. The second connection portion is arranged between the second actuator 3 and the third actuator 3' and interconnects them fluidically.

Connection portions 8 which are connected according to FIG. 3 or 4 can also be provided as the first and/or second connection portion 8, 8'.

In addition, a further expansion by one or more further connection portions and by one or more further actuators is possible.

Figure 14:
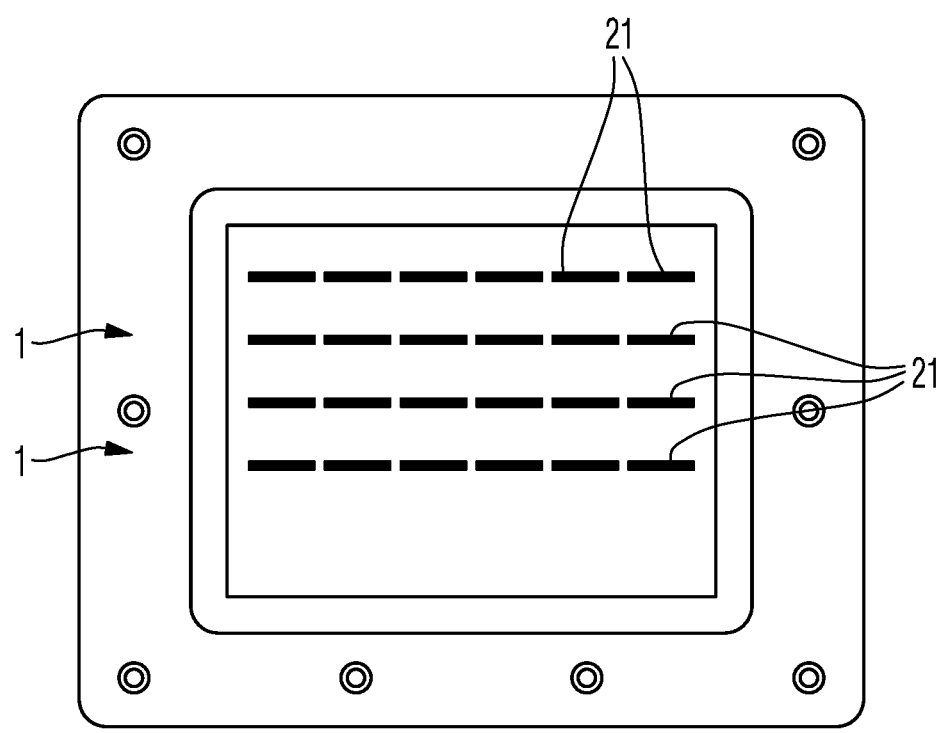
FIG. 14 is a schematic plan view of an arrangement of parallel oscillator devices each having a plurality of actuators.

FIG. 14 is a schematic plan view of an arrangement of parallel oscillator devices 1, each having a multiplicity of actuators.

This figure shows the outlet slits 21 of the respective nozzle arrangements 20 of the parallel oscillator devices 1. Many different blow-out patterns can be generated by an appropriate configuration of the connection portions 8 with the parallel or downstream arrangement of the oscillator devices 1. Furthermore, coherent structures and influences on the air flow of the oscillator devices can also be investigated by a flow measurement.

Although the present disclosure has been described above on the basis of preferred embodiments, it is not restricted thereto, but can be modified in many different ways.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or one do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft or Spacecraft fluidic oscillator device for or in a flow control system, the device comprising: a first fluidic actuator and an adjacent second fluidic actuator, wherein each of the actuators has an inlet for supplying pressure and a first and a second outlet, from which an actuator flow is discharged; and a fluidic control for controlling an oscillating discharge of the actuator flow from the first and second outlet of the actuators, wherein the control has a connection portion configured as a flat part which is arranged between the first actuator and the second actuator, wherein the control is devoid of a feedback line external to the connection portion.

2. The fluidic oscillator device of claim 1, wherein the control comprises a control channel in each actuator, wherein a control flow, which is guided through the control channel, determines a respectively active outlet of the actuator, wherein the control channels at the actuators respectively have first and second junctions and wherein the connection portion has a first and a second connection channel which fluidically interconnect the junctions of the control channels.

3. The fluidic oscillator device of claim 2, wherein the connection portion also has a bypass channel which provides a fluidic connection between the first and the second connection channel and is configured such that the actuators and the control are operated at a common oscillation frequency.

4. The fluidic oscillator device of claim 2, wherein one or both of the actuators are configured as flat parts with opposing planar faces.

5. The fluidic oscillator device of claim 4, wherein the flat parts are stacked in a direction perpendicular to the planar faces in a force-locking manner.

6. The fluidic oscillator device of claim 4, wherein the bypass channel is configured as a groove which is introduced into the connection portion.

7. The fluidic oscillator device of claim 6, wherein the groove runs in a first planar side and in a second planar side of the connection portion, a passage being provided through the connection portion.

8. The fluidic oscillator device of claim 2, wherein the bypass channel comprises at least one curve.

9. The fluidic oscillator device of claim 8, wherein the bypass channel comprises a plurality of curves which are arranged in a serpentine-like manner.

10. The fluidic oscillator device of claim 4, wherein the first junction of the control channel is arranged on a first planar face of the respective actuator and the second junction of the control channel is arranged on a second planar face of the respective actuator.

11. The fluidic oscillator device of claim 2, wherein the first junction of the control channel of the first actuator is connected by the first connection channel of the connection portion to the first junction of the control channel of the second actuator.

12. The fluidic oscillator device of claim 11, wherein the second junction of the control channel of the first actuator is connected by the second connection channel of the connection portion to the second junction of the control channel of the second actuator.

13. The fluidic oscillator device of claim 11, wherein the first connection channel leads through the connection portion in a first planar side of the connection portion.

14. The fluidic oscillator device of claim 12, wherein the second connection channel leads through the connection portion in a second planar side of the connection portion.

15. The fluidic oscillator device of claim 2, wherein the first junction of the control channel of the first actuator is connected by the first connection channel of the connection portion to the second junction of the control channel of the second actuator.

16. The fluidic oscillator device of claim 15, wherein the second junction of the control channel of the first actuator is connected by the second connection channel of the connection portion to the first junction of the control channel of the second actuator.

17. The fluidic oscillator device of claim 15, wherein the first connection channel leads through the connection portion from a first planar side of the connection portion to a second planar side.

18. The fluidic oscillator device of claim 16, wherein the second connection channel leads through the connection portion from the second flat side of the connection portion to the first flat side.

19. The fluidic oscillator device of claim 1, wherein at least a third fluidic actuator and at least a second connection portion are provided, wherein the second connection portion is arranged between the second actuator and the third actuator and fluidically interconnects them.

20. The fluidic oscillator device of claim 19, comprising a plurality of further fluidic actuators and a plurality of further connection portions, wherein a respectively one of the further connection portions is arranged between respectively two of the further actuators and fluidically interconnects them.

21. The fluidic oscillator device of claim 1, wherein, for at least one of the actuators, one of the first or the second outlet has a start outlet configuration which allows the actuator flow to discharge at least mainly through the one outlet at a beginning of a pressurization of the actuator.

22. The fluidic oscillator device of claim 21, wherein the start outlet configuration comprises a lower fluidic resistance than the configuration of the other outlet of the actuator.

23. The fluidic oscillator device of claim 22, wherein the start outlet configuration comprises a larger passable cross section than the configuration of another outlet of the actuator.

* * * * *